United States Patent
Yoo et al.

(10) Patent No.: US 11,342,604 B2
(45) Date of Patent: May 24, 2022

(54) BATTERY MODULE IN WHICH COOLING AND ASSEMBLY STRUCTURE IS SIMPLIFIED, AND MANUFACTURING METHOD THEREFOR

(71) Applicant: LG Chem, Ltd., Seoul (KR)

(72) Inventors: Jae-Min Yoo, Daejeon (KR); Dal-Mo Kang, Daejeon (KR); Su-Chang Kim, Daejeon (KR); Jeong-O Mun, Daejeon (KR); Jae-Uk Ryu, Daejeon (KR); Ji-Su Yoon, Daejeon (KR)

(73) Assignee: LG Energy Solution, Ltd.

( * ) Notice: Subject to any disclaimer, the term of this patent is extended or adjusted under 35 U.S.C. 154(b) by 118 days.

(21) Appl. No.: 16/610,302

(22) PCT Filed: Sep. 27, 2018

(86) PCT No.: PCT/KR2018/011405
§ 371 (c)(1),
(2) Date: Nov. 1, 2019

(87) PCT Pub. No.: WO2019/083176
PCT Pub. Date: May 2, 2019

(65) Prior Publication Data
US 2020/0083575 A1    Mar. 12, 2020

(30) Foreign Application Priority Data
Oct. 27, 2017 (KR) .................. 10-2017-0141468

(51) Int. Cl.
*H01M 10/613* (2014.01)
*H01M 10/643* (2014.01)
(Continued)

(52) U.S. Cl.
CPC ....... *H01M 10/613* (2015.04); *H01M 10/643* (2015.04); *H01M 10/653* (2015.04); *H01M 10/6551* (2015.04); *H01M 50/213* (2021.01)

(58) Field of Classification Search
CPC ..... H01M 10/613–656; H01M 50/213; H01M 10/643; H01M 10/653; H01M 10/6551
See application file for complete search history.

(56) References Cited

U.S. PATENT DOCUMENTS

| 2007/0218353 A1* | 9/2007 | Straubel ............... B60L 3/0046 429/120 |
| 2010/0104936 A1 | 4/2010 | Meintschel et al. |

(Continued)

FOREIGN PATENT DOCUMENTS

| DE | 102015118605 A1 | 7/2017 |
| JP | 2010519714 A | 6/2010 |

(Continued)

OTHER PUBLICATIONS

Extended European Search Report including Written Opinion for Application No. EP18871412.5, dated Jul. 7, 2020, pp. 1-7.

(Continued)

*Primary Examiner* — Milton I Cano
*Assistant Examiner* — Jenna Shulman
(74) *Attorney, Agent, or Firm* — Lerner, David, Littenberg, Krumholz & Mentlik, LLP

(57) ABSTRACT

A battery module includes a plurality of can-type secondary batteries; a cooling tray formed in a container shape and having an accommodation space capable of accommodating the plurality of can-type secondary batteries; a heatsink having a hollow structure in which a coolant flows, the heatsink being disposed in contact with an outer surface of the cooling tray; and a thermally conductive adhesive solution filled in the accommodation space of the cooling tray, (Continued)

wherein the plurality of can-type secondary batteries are arranged such that a lower portion thereof is immersed in the thermally conductive adhesive solution.

13 Claims, 6 Drawing Sheets

(51) Int. Cl.
  *H01M 10/653* (2014.01)
  *H01M 10/6551* (2014.01)
  *H01M 50/213* (2021.01)

(56) References Cited

U.S. PATENT DOCUMENTS

| | | |
|---|---|---|
| 2011/0090614 A1 | 4/2011 | Guerin et al. |
| 2011/0200856 A1 | 8/2011 | Yasui et al. |
| 2014/0045037 A1 | 2/2014 | Nishikawa et al. |
| 2016/0149174 A1 | 5/2016 | Okura |
| 2017/0200995 A1 | 7/2017 | Phlegm et al. |
| 2018/0019508 A1 | 1/2018 | Lee et al. |
| 2018/0294535 A1 | 10/2018 | Choi et al. |

FOREIGN PATENT DOCUMENTS

| | | |
|---|---|---|
| JP | 4514344 B2 | 7/2010 |
| JP | 2011508366 A | 3/2011 |
| JP | 5221820 B1 | 6/2013 |
| JP | 2014071939 A | 4/2014 |
| KR | 100637469 B1 | 10/2006 |
| KR | 20110042119 A | 4/2011 |
| KR | 101067627 B1 | 9/2011 |
| KR | 20140090336 A | 7/2014 |
| KR | 20160063265 A | 6/2016 |
| KR | 20160115582 A | 10/2016 |
| KR | 20170135479 A | 12/2017 |
| KR | 20180005456 A | 1/2018 |

OTHER PUBLICATIONS

International Search Report from Application No. PCT/KR2018/011405 dated Jan. 25, 2019, 2 pages.

\* cited by examiner

BATTERY MODULE IN WHICH COOLING AND ASSEMBLY STRUCTURE IS SIMPLIFIED, AND MANUFACTURING METHOD THEREFOR

CROSS-REFERENCE TO RELATED APPLICATIONS

This application is a national phase entry under 35 U.S.C. § 371 of International Application No. PCT/KR2018/011405 filed Sep. 27, 2018, which claims priority from Korean Patent Application No. 10-2017-0141468 filed on Oct. 27, 2017, the disclosures of which are incorporated herein by reference.

TECHNICAL FIELD

The present disclosure relates to a battery module, and more particularly, to a battery module to which a new assembling structure is applied in order to provide both cooling efficiency and a simplified assembling structure for secondary batteries, and a method for manufacturing the battery module.

BACKGROUND ART

A secondary battery cell includes positive and negative electrode current collectors, a separator, active materials and an electrolyte, and may be repeatedly charged and discharged by electrochemical reactions between components. Since the battery cells are densely provided in a compact space of a battery module, it is important to easily release the heat generated by each battery cell. Since the battery cell is charged and discharged due to an electrochemical reaction, if the heat of the battery module generated during the charging and discharging process is not effectively removed, heat accumulation occurs, which may promote the degradation of the battery module, and in more severe cases, cause ignition or explosion.

Thus, a high-output large-capacity battery module and a battery pack having the battery module are required to have a cooling device for cooling battery cells included therein.

FIG. 1 is a diagram schematically showing a cooling structure of a conventional battery module. As shown in FIG. 1, the conventional battery module may include, for example, secondary battery cells 1, a housing 2 for accommodating and holding the secondary battery cells 1, a heatsink 3, and a thermal interface material (TIM) 4.

Since the secondary battery cells 1 should be electrically connected to each other, it is necessary to fix the secondary battery cells 1 securely. To this end, the housing 2 typically has a fixing structure capable of holding the plurality of secondary battery cells 1 individually. For example, as shown in FIG. 1, a cylindrical secondary battery may be inserted to constrain the secondary battery cells 1. Alternatively, a separate fixing frame may be used so that the fixing frame is assembled to the housing 2 in a state of holding the plurality of secondary battery cells 1 integrally. The housing 2 may be made of aluminum or aluminum alloy with excellent mechanical rigidity and heat dissipation performance.

The heatsink 3 is a cooling device for suitably keeping the temperature of secondary battery cells during charging and discharging and may be disposed in contact with a lower portion of the housing 2. Here, the heatsink 3 may be configured so that a coolant flows therein, and may absorb heat from the secondary battery cells 1 through the housing 2.

The TIM 4 is disposed at an interface between the housing 2 and the heatsink 3 to reduce contact resistance between the housing 2 and the heatsink 3. The TIM 4 may employ a thermally conductive pad or resin.

However, in the cooling configuration of the conventional battery module, even though the TIM 4 is used, the cooling efficiency is inevitably lowered due to the resistance elements present on the heat conduction path. In addition, since a fixing structure needs to be added to the housing 2 or a separate component needs to be used in order to fix the secondary battery cells 1, it is difficult to design a secondary battery assembling structure at the housing 2, and the energy density is lowered.

DISCLOSURE

Technical Problem

The present disclosure is designed to solve the problems of the related art, and therefore the present disclosure is directed to providing a battery module, which has a new cooling and assembling structure capable of providing both cooling efficiency and a simplified assembling structure for secondary batteries, and a method for manufacturing the battery module.

However, the objects of the present disclosure are not limited to the above, and objects not mentioned herein may be clearly understood from the present specification and the accompanying drawings by those skilled in the art.

Technical Solution

In one aspect of the present disclosure, there is provided a battery module, comprising: a plurality of can-type secondary batteries; a cooling tray formed in a container shape and having an accommodation space capable of accommodating the plurality of can-type secondary batteries; a heatsink having a hollow structure in which a coolant flows, the heatsink being disposed in contact with an outer surface of the cooling tray; and a thermally conductive adhesive solution filled in the accommodation space of the cooling tray, wherein the plurality of can-type secondary batteries are disposed to stand up so that a lower portion thereof is immersed in the thermally conductive adhesive solution.

The thermally conductive adhesive solution may be filled to a height of the accommodation space of the cooling tray.

The cooling tray may have a plurality of placing portions into which lower ends of the can-type secondary batteries are partially fitted.

The battery module may further comprise a tray cover coupled to the cooling tray to seal the accommodation space, and the tray cover may include a plurality of cooling sockets having a pipe shape and provided to cover outer circumferences of the can-type secondary batteries, which are exposed above a surface of the thermally conductive adhesive solution.

The tray cover may further include a connection portion provided to connect the plurality of cooling sockets and a side surface of the tray cover.

The plurality of cooling sockets, the connection portion and the side surface of the tray cover may each include a hollow structure to communicate with each other so that a flow path is formed therein.

The can-type secondary battery may be a rectangular or cylindrical secondary battery.

In another aspect of the present disclosure, there is also provided a battery pack, comprising the battery module described above.

In another aspect of the present disclosure, there is also provided a method for manufacturing a battery module, comprising: a preparation step of preparing a cooling tray having a container shape; an injection step of injecting a thermally conductive adhesive solution into the cooling tray to a preset height; and a disposition step of fixing a plurality of can-type secondary batteries to be vertically immersed in the thermally conductive adhesive solution before the thermally conductive adhesive solution is cured.

The cooling tray may have a plurality of placing portions into which lower ends of the can-type secondary batteries are partially fitted, and in the disposition step, the can-type secondary batteries may be disposed to correspond to the placing portions one by one.

The method may further comprise a tray cover coupling step of sealing an accommodation space of the cooling tray, which accommodates the plurality of can-type secondary batteries, by using a tray cover coupled to the cooling tray.

The tray cover may include a plurality of cooling sockets having a pipe shape and provided to cover outer circumferences of the can-type secondary batteries, which are exposed above a surface of the thermally conductive adhesive solution. A connection portion may be provided to connect the plurality of cooling sockets and a side surface of the tray cover. In the tray cover coupling step, the can-type secondary batteries may be inserted into and held by the cooling sockets one by one.

Advantageous Effects

According to an embodiment of the present disclosure, it is possible to provide a battery module, which has a new cooling and assembling structure capable of providing both cooling efficiency and a simplified assembling structure.

Specifically, since the can-type secondary batteries are fixed using a thermally conductive adhesive solution, a separate fixing structure may not be used. In addition, since the contact area between the thermally conductive adhesive solution and the can-type secondary batteries is sufficiently secured, the cooling efficiency may be improved.

According to another embodiment of the present disclosure, since a tray cover coupled to the cooling tray to protect the can-type secondary batteries from the outside and to additionally fix and cool the can-type secondary batteries is provided, the can-type secondary batteries may be fixed and cooled more efficiently.

The effects of the present disclosure are not limited to the above, and effects not mentioned herein may be clearly understood from the present specification and the accompanying drawings by those skilled in the art.

BEST MODE

Figure 1:
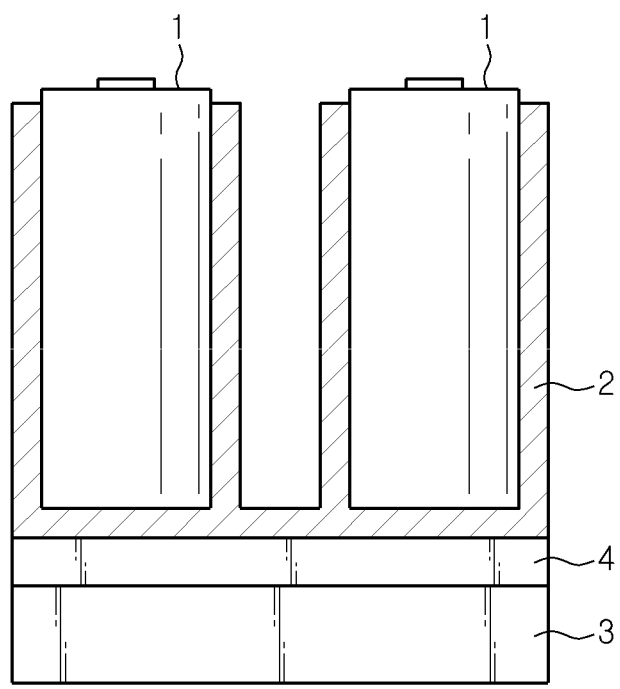
FIG. 1 is a diagram schematically showing a cooling structure of a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
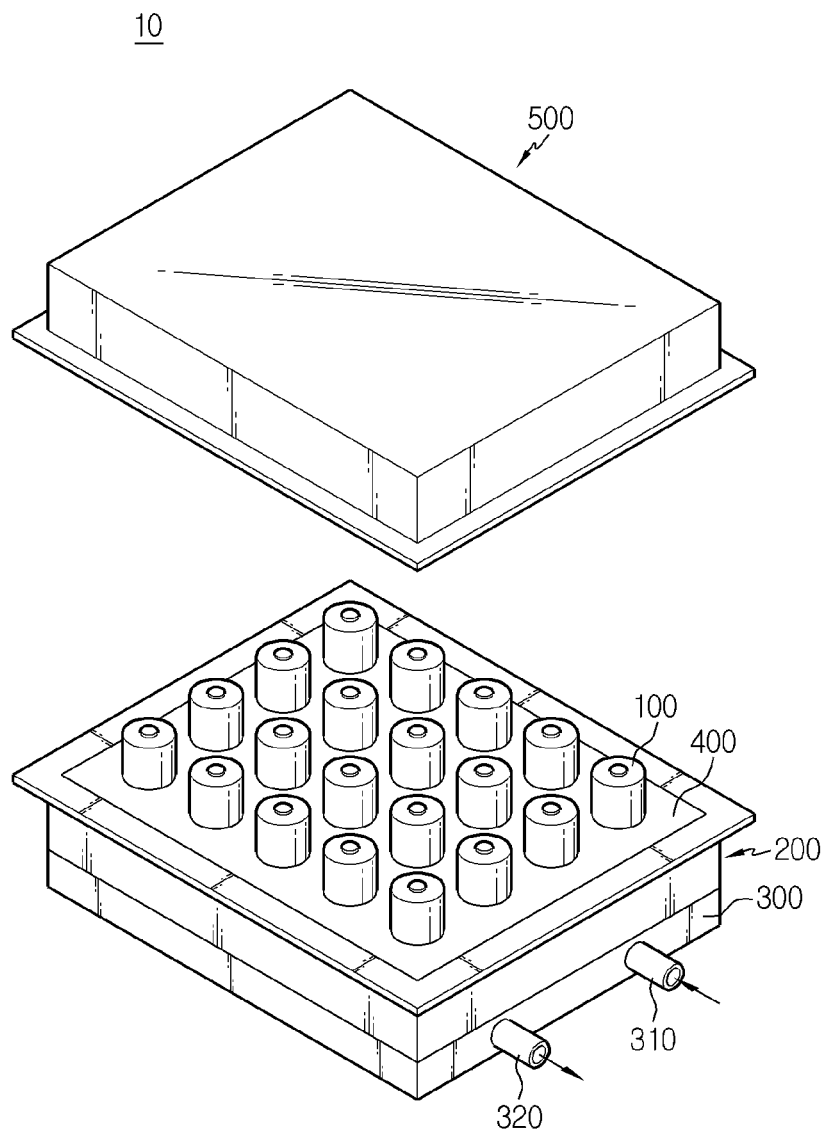
FIG. 2 is a perspective view schematically showing a battery module according to an embodiment of the present disclosure.
Figure 3:
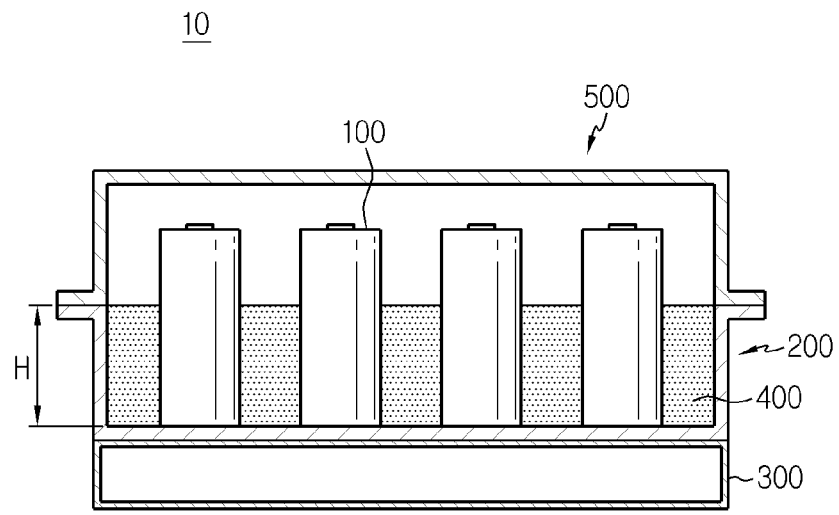
FIG. 3 is a cross-sectional view schematically showing the battery module according to an embodiment of the present disclosure.
Figure 4:
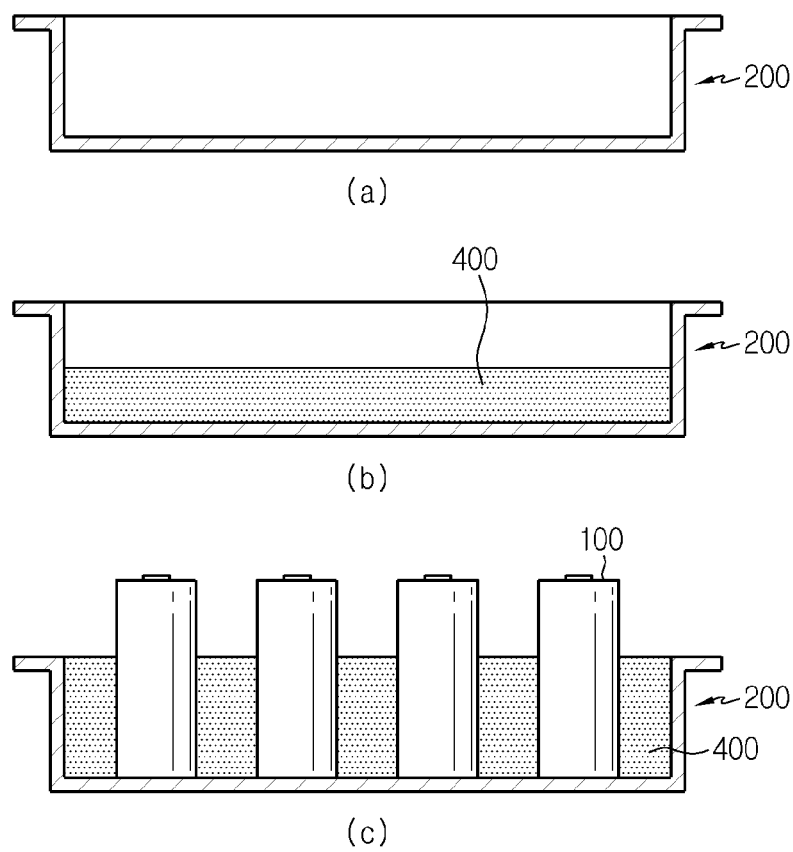
FIG. 4 is a diagram illustrating processes for manufacturing the battery module according to an embodiment of the present disclosure.

FIGS. 2 and 3 are, respectively, a perspective view and a cross-sectioned view schematically showing a battery module according to an embodiment of the present disclosure, and FIG. 4 is a diagram for illustrating processes for manufacturing the battery module according to an embodiment of the present disclosure.

Referring to the figures, a battery module 10 according to an embodiment of the present disclosure may include a plurality of can-type secondary batteries 100, a cooling tray 200 having an accommodation space capable of accommodating the plurality of can-type secondary batteries 100, a heatsink 300, and a thermally conductive adhesive solution 400 filled in the accommodation space of the cooling tray 200.

First, the secondary battery employed in the battery module 10 according to the present disclosure may be a can-type secondary battery 100. Here, the can-type secondary battery 100 is a secondary battery in which an electrode assembly is included in a metal can, and may be classified into a cylindrical battery and a rectangular battery depending on the shape of the metal can. In this embodiment, the cylindrical secondary batteries are used, but the present disclosure is not limited thereto. That is, the cylindrical secondary battery of this embodiment may be replaced by a rectangular secondary battery.

Although not shown in detail in the figures, the secondary battery may include a cylindrical battery cell, a jelly-roll type electrode assembly accommodated in the battery cell, and a cap assembly coupled to an upper portion of the battery can. Here, the cylindrical battery can may be made of a lightweight conductive metal material such as aluminum, stainless steel or an alloy thereof.

The can-type secondary batteries 100 may be connected in series and/or in parallel depending on the output and capacity demanded for the battery module 10. Although not shown in the figures for convenience, the can-type secondary batteries 100 may be electrically connected to each other by a bus bar made of a copper plate.

The cooling tray 200 may be a structure that provides an accommodation space for accommodating the can-type secondary batteries 100.

As shown in FIGS. 2 to 4, the cooling tray 200 has a generally wide, flat and sealed bottom surface and may have a container shape so that a thermally conductive adhesive solution is filled to a preset height. In addition, the cooling tray 200 may be made of a metal material having excellent thermal conductivity to absorb the heat of the can-type secondary cylindrical batteries.

An upper end of the cooling tray 200 may be bent to be horizontal with respect to the ground. The cooling tray 200 may be coupled to a tray cover 500 having a lower surface facing the bent upper surface thereof. At such time, the upper surface of the cooling tray 200 and the lower surface of the tray cover 500 may be adhered to each other by welding. Alternatively, the upper surface of the cooling tray 200 and the lower surface of the tray cover 500 may be bolted together after an O-ring is disposed therebetween. The can-type secondary batteries 100 may be protected from the outside since the inner side of the battery module is shielded by the coupling of the cooling tray 200 and the tray cover 500 as shown in FIG. 3.

The heatsink 300 is a component that indirectly cools the can-type secondary batteries 100 by absorbing the heat from the cooling tray 200 by means of thermal contact by allowing a coolant to pass through an inner flow path thereof, and may be disposed in contact with the bottom surface of the cooling tray 200.

The coolant flowing in the flow path is not particularly limited as long as it may easily flow through the flow path and provides excellent cooling ability. For example, the coolant may be water that may maximize cooling efficiency due to a high latent heat. However, the coolant may employ an antifreeze, a gas refrigerant, air, or the like, which may flow, without being limited to the above.

The heatsink 300 may be made of aluminum or aluminum alloy having high thermal conductivity, without being limited thereto. For example, the heatsink 300 may be made of copper, gold or silver. In addition, the heatsink 300 may be made of a ceramic material such as aluminum nitride and silicon carbide, other than metals.

In this embodiment, the heatsink 300 is a rectangular plate shape with a hollow structure and has a flow path therein. Also, an inlet 310 and an outlet 320 of the flow path may be provided at one side of the heatsink 300, respectively. The inlet 310 and the outlet 320 of the flow path may be connected to an inlet and an outlet of another heatsink, or to an external cooling water supply pipe and an external cooling water exhaust pipe.

Meanwhile, in the present disclosure, the plurality of can-type secondary batteries 100 are configured to be fixed only by the thermally conductive adhesive solution 400 without the use of a fixing structure or a separate fixing part in the cooling tray 200. The thermally conductive adhesive solution 400 is a material having thermal conductivity and adhesive properties and may employ, for example, an epoxy resin, a silicone resin or the like.

The thermally conductive adhesive solution 400 may be filled up to a height H of the accommodation space of the cooling tray 200. In this case, in the cooling tray 200, the can-type secondary batteries 100 may be fixedly positioned, and the contact area between the thermally conductive adhesive solution 400 and the can-type secondary batteries 100 may be maximized. Accordingly, the thermal conductivity between the cooling tray 200 and the can-type secondary batteries 100 may be significantly improved.

In other words, if the can-type secondary battery 100 is placed in contact with the cooling tray 200 using a separate fixing part in the cooling tray 200, the thermal contact resistance is large due to the difference in surface roughness between the empty space and the objects. However, in the present disclosure, since the thermally conductive adhesive solution 400 fills the empty space, the can-type secondary batteries 100 may be naturally adhered and fixed in the thermally conductive adhesive solution 400 without using a separate fixing part. In addition, the thermal contact resistance caused by the difference in surface roughness between the cooling tray 200 and the can-type secondary batteries 100 is substantially not generated. Thus, the heat generated from the can-type secondary batteries 100 may be conducted to the cooling tray 200 more quickly and emitted to the heatsink 300.

Figure 5:
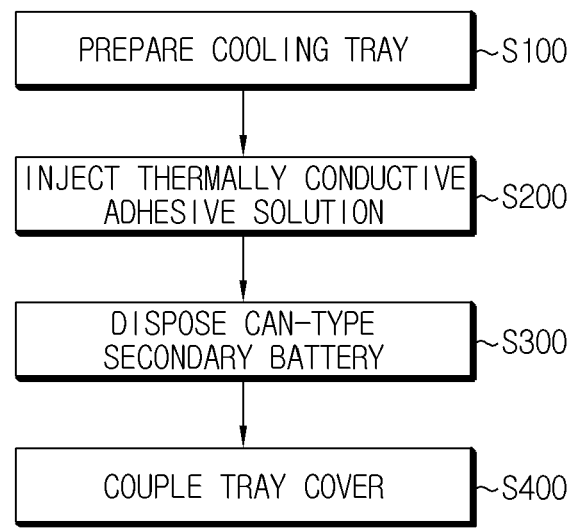
FIG. 5 is a flowchart illustrating a method for manufacturing the battery module according to an embodiment of the present disclosure.

Next, a process for manufacturing process the battery module 10 will be briefly described with reference to FIGS. 4 and 5.

First, as in the portion (a) of FIG. 4, the cooling tray 200 of a container shape is prepared on a work place of a table (S100).

After that, as in the portion (b) of FIG. 4, the thermally conductive adhesive solution 400 is injected into the cooling tray 200 to a preset height so that the accommodation space is partially filled with the thermally conductive adhesive solution 400 (S200). After that, as shown in the portion (c) of FIG. 4, before the thermally conductive adhesive solution 400 is cured, a plurality of can-type secondary batteries 100 are vertically immersed in the thermally conductive adhesive solution 400, respectively. At this time, a pick-up jig (not shown) for the can-type secondary battery 100 may be used to immerse the can-type secondary batteries 100 at once in a bundle. After a predetermined time, the thermally conductive adhesive solution 400 is cured so that the can-type secondary batteries 100 are perfectly fixed at the corresponding locations (S300).

After that, though not shown in FIG. 4, as shown in FIG. 3, the accommodation space accommodating the plurality of can-type secondary batteries 100 is sealed using the tray cover 500 coupled with the cooling tray 200 (S400). In addition, the cooling tray 200 is disposed at the upper surface of the heatsink 300.

For reference, in the portion (b) of FIG. 4, the preset height may mean the height of the surface of the thermally conductive adhesive solution 400 filled in the accommodation space of the cooling tray 200, when all of the can-type secondary batteries 100 are immersed in the thermally conductive adhesive solution 400.

Figure 6:
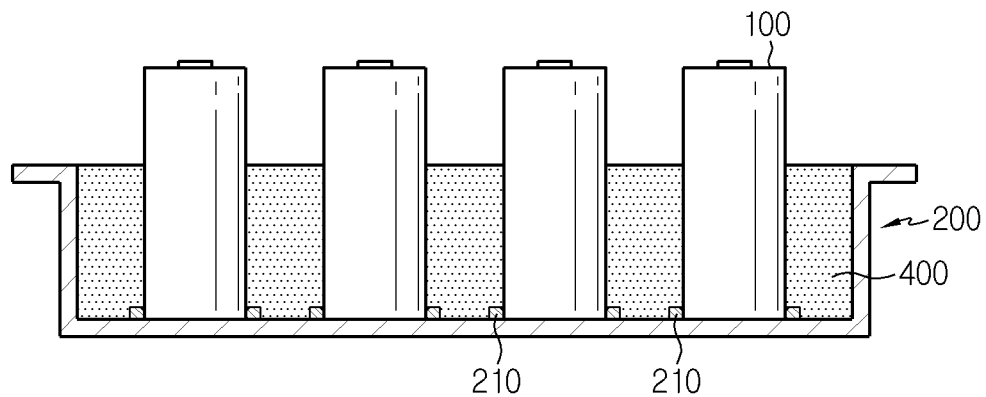
FIG. 6 is a cross-sectional view illustrating a battery module according to another embodiment of the present disclosure.

Meanwhile, FIG. 6 is a diagram corresponding to the portion (c) of FIG. 4 and depicts another embodiment of the present disclosure. In the embodiment of FIG. 6, the cooling tray 200 further includes a plurality of placing portions 210 into which the lower ends of the can-type secondary batteries 100 are partially fitted.

In the former embodiment, when the can-type secondary batteries 100 are disposed on the cooling tray 200, since there is no alignment criterion, the positions of the respective can-type secondary batteries 100 may not be aligned with each other. Also, until the thermally conductive adhesive solution 400 is fully cured, the can-type secondary batteries 100 are incompletely fixed and thus may be leaned just by a slight impact. However, if the cooling tray 200 having the plurality of placing portions 210 as shown in FIG. 6 is used, the problem of the former embodiment may be solved.

That is, since the plurality of placing portions 210 of FIG. 6 are provided at predetermined locations on the bottom surface of the cooling tray 200, it is possible to guide the can-type secondary batteries 100 to be arranged properly. Thus, the can-type secondary batteries 100 may be easily arranged on the cooling tray 200. In addition, the plurality of the placing portions 210 may have, for example, a ring shape into which the lower ends of the can-type secondary batteries 100 may be partially fitted, thereby playing a role of holding the lower ends of the can-type secondary batteries 100. Thus, when the plurality of can-type secondary batteries 100 are fixed in the thermally conductive adhesive solution 400, the can-type secondary batteries 100 may be disposed in the corresponding placing portions 210 one by one, thereby reducing the assembling tolerance of the can-type secondary batteries 100.

Figure 7:
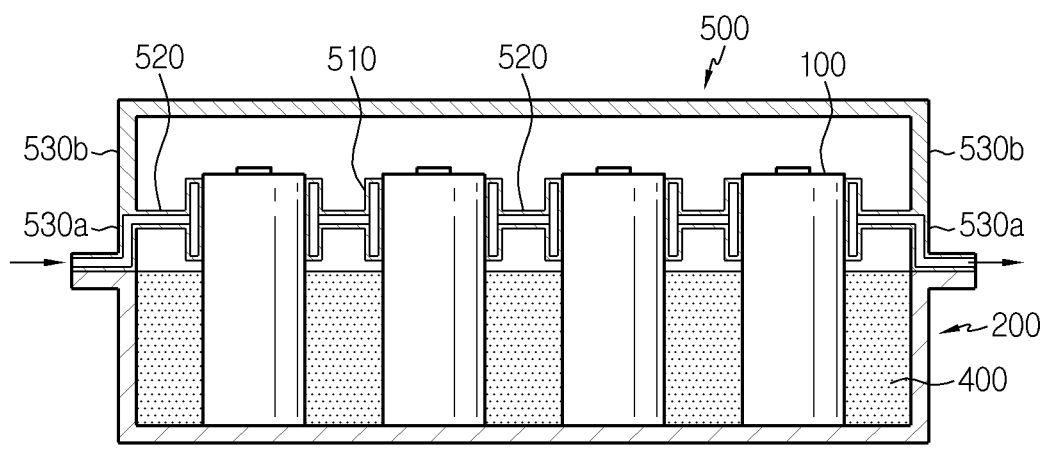
FIG. 7 is a cross-sectional view schematically showing a battery module according to still another embodiment of the present disclosure.
Figure 8:
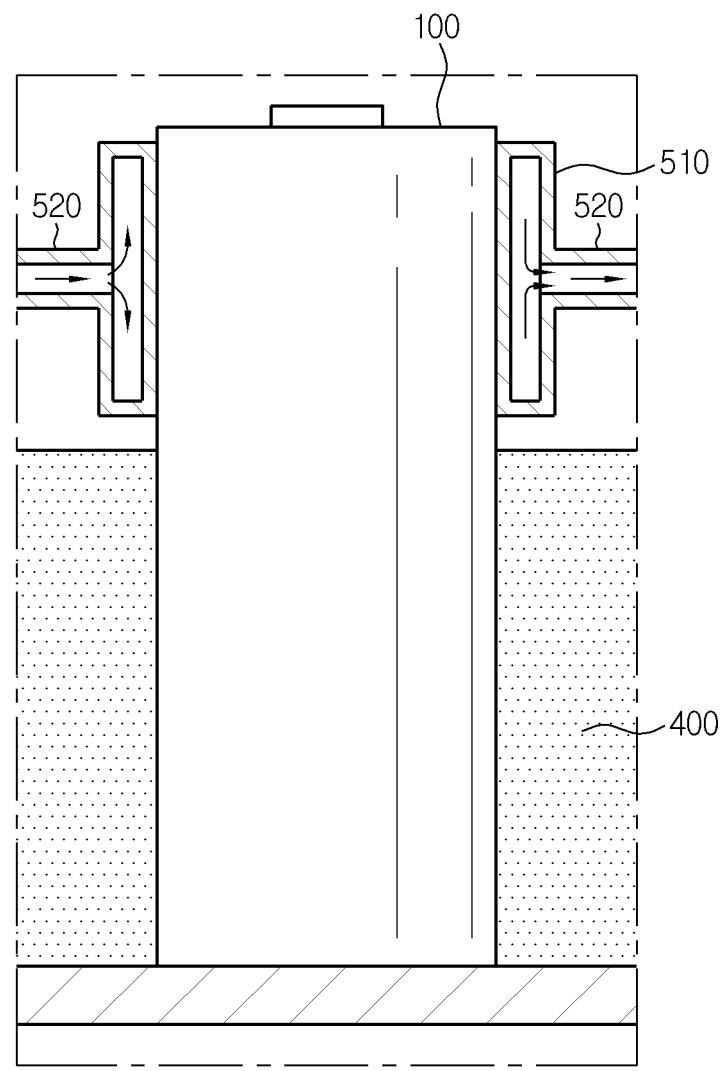
FIG. 8 is an enlarged view showing main parts of FIG. 7.

FIG. 7 is a cross-sectional view schematically showing a battery module 10 according to still another embodiment of the present disclosure, and FIG. 8 is an enlarged view showing main parts of FIG. 7.

Next, a battery module 10 according to another embodiment of the present disclosure will be described with reference to FIGS. 7 and 8. The same reference numerals as those in the former embodiment denote the same components and will not be described in detail here.

Referring to the figures, the battery module 10 according to still another embodiment of the present disclosure includes a tray cover 500 coupled to the cooling tray 200 to seal the accommodation space. The tray cover 500 may include a plurality of cooling sockets 510 and a connection portion 520 connecting the plurality of cooling sockets 510.

The cooling socket 510 has a pipe shape capable of covering the outer circumference of the can-type secondary battery 100 and is formed to surround the upper end of the can-type secondary battery 100 exposed above the surface of the thermally conductive adhesive solution 400. As shown in FIG. 7, the cooling sockets 510 may be connected to each other by the connection portion 520. In addition, both ends of the connection portion 520 may be connected to side surfaces 530a, 530b of the tray cover. In other words, the cooling sockets 510 may be fixedly coupled to the side surfaces 530a, 530b of the tray cover by the connection portion 520. Thus, if the upper portion of the cooling tray 200 is covered with the tray cover 500, the can-type secondary batteries 100 may be inserted into and held by the corresponding cooling sockets 510, respectively. In this case, the can-type secondary batteries 100 may be fixed additionally, thereby improving the stability of the can-type secondary batteries 100.

Meanwhile, the upper portion of the can-type secondary battery 100 at which electrode terminals are located generate heat more greatly, compared to other portions. However, in the former embodiments, the upper portion of the can-type secondary battery 100 is not in contact with the thermally conductive adhesive solution 400, which may cause a greater temperature difference between the upper portion of the can-type secondary battery 100 and the portion immersed in the thermally conductive adhesive solution 400. In order to solve this problem, in this embodiment, the upper portion of the can-type secondary battery 100 may be cooled separately.

Specifically, in the tray cover 500 of this embodiment, the plurality of cooling sockets 510, the connection portion 520 and the side surfaces 530a, 530b of the tray cover may communicate with each other in a hollow structure so that a flow path is provided therein. Preferably, in FIG. 7, the flow path is formed in a lower region 530a of the tray cover 500 based on the intersection point where the side surfaces 530a, 530b of the tray cover meet the connection portion 520, and the flow path does not need to be formed in an upper region 530b.

For example, the coolant may be introduced at a left end of the tray cover 500, pass through the connection portion 520 and each cooling socket 510, and be discharged at a right end of the tray cover 500. At this time, as shown in FIG. 8, a coolant flows in the cooling socket 510, and the cooling socket 510 surrounds a periphery of the upper end of the can-type secondary battery 100. Thus, it is possible to effectively cool the upper portion of the can-type secondary battery 100, which generate heat greatly.

If the tray cover 500 configured as above is used, the tray cover 500 may be coupled to the cooling tray 200 to protect the can-type secondary batteries 100 from the outside and additionally further improve the fixation and cooling performance for the can-type secondary batteries 100.

Meanwhile, a battery pack according to the present disclosure may include at least one battery module of the present disclosure. In addition to the battery module, the battery pack according to the present disclosure may further include a pack case for accommodating the battery module, and various devices for controlling charge and discharge of the battery module such as a battery management system (BMS), a current sensor, a fuse or the like.

The battery module according to the present disclosure may be applied to a vehicle such as an electric vehicle or a hybrid electric vehicle, or a power storage system (ESS).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery module, comprising:
a plurality of can-type secondary batteries each having a respective longitudinal axis;
a cooling tray formed in a container shape and having an accommodation space capable of accommodating the plurality of can-type secondary batteries;
a heatsink having a hollow structure in which a coolant flows, the heatsink being disposed in contact with an outer surface of the cooling tray;
a thermally conductive adhesive solution filled in the accommodation space of the cooling tray; and
a tray cover coupled to the cooling tray to seal the accommodation space,
wherein the plurality of can-type secondary batteries are each arranged such that a lower portion thereof along the respective longitudinal axis is immersed in the thermally conductive adhesive solution and such that an upper portion thereof along the respective longitudinal axis is exposed above a surface of the thermally conductive adhesive solution so as to define an exposed portion of a respective can-type secondary battery, and wherein the tray cover includes a plurality of cooling sockets each being shaped and positioned to directly contact and encircle the exposed portion of the respective one of the can-type secondary batteries about the longitudinal axis thereof.

2. The battery module according to claim 1,
wherein the thermally conductive adhesive solution is filled to a height of the accommodation space of the cooling tray.

3. The battery module according to claim 1,
wherein the cooling tray has a plurality of placing portions into which lower ends of the can-type secondary batteries are partially fitted.

4. The battery module according to claim 1,
wherein the tray cover further includes a connection portion configured to connect the plurality of cooling sockets with a side surface of the tray cover.

5. The battery module according to claim 4,
wherein the plurality of cooling sockets, the connection portion, and the side surface of the tray cover each include a hollow structure to communicate with each other so that a flow path is defined therein.

6. The battery module according to claim 1,
wherein the can-type secondary batteries are rectangular or cylindrical secondary batteries.

7. A battery pack, comprising the battery module according to claim 1.

8. A battery module, comprising:
a plurality of can-type secondary batteries each having a respective longitudinal axis;
a cooling tray formed in a container shape and having an accommodation space capable of accommodating the plurality of can-type secondary batteries;
a heatsink having a hollow structure in which a coolant flows, the heatsink being disposed in contact with an outer surface of the cooling tray;
a thermally conductive adhesive solution filled in the accommodation space of the cooling tray; and
a tray cover coupled to the cooling tray to seal the accommodation space, wherein the plurality of can-type secondary batteries are each arranged such that a lower portion thereof along the respective longitudinal axis is immersed in the thermally conductive adhesive solution so as to define an immersed portion of a respective can-type secondary battery and such that an upper portion thereof along the respective longitudinal axis is exposed above a surface of the thermally conductive adhesive solution so as to define an exposed portion of the respective can-type secondary battery, and wherein the tray cover includes a plurality of cooling sockets each being shaped and positioned to encircle the exposed portion of the respective one of the can-type secondary batteries about the longitudinal axis thereof without encircling the immersed portion of the respective one of the can-type secondary batteries.

9. The battery module according to claim 8,
wherein the thermally conductive adhesive solution is filled to a height of the accommodation space of the cooling tray.

10. The battery module according to claim 8,
wherein the tray cover further includes a connection portion configured to connect the plurality of cooling sockets with a side surface of the tray cover.

11. The battery module according to claim 10,
wherein the plurality of cooling sockets, the connection portion, and the side surface of the tray cover each include a hollow structure to communicate with each other so that a flow path is defined therein.

12. The battery module according to claim 8,
wherein the can-type secondary batteries are rectangular or cylindrical secondary batteries.

13. A battery pack, comprising the battery module according to claim 8.

* * * * *